(12) United States Patent
Davis et al.

(10) Patent No.: US 10,035,258 B2
(45) Date of Patent: Jul. 31, 2018

(54) SYSTEM AND METHOD FOR HIGH-VOLUME FILLING OF PHARMACEUTICAL PRESCRIPTIONS

(71) Applicant: Parata Systems, LLC, Durham, NC (US)

(72) Inventors: Craig Steven Davis, Morrisville, NC (US); Bradley Kenneth Smith, Cary, NC (US); Mark Alan Uebel, Morrisville, NC (US); Michael Lee Jordan, Alpharetta, GA (US); Merle Elmer Hertzler, West Chester, PA (US); Tobias Heineck, Durham, NC (US); Daryl Oshatz, Los Altos, CA (US)

(73) Assignee: Parata Systems, LLC, Durham, NC (US)

( * ) Notice: Subject to any disclaimer, the term of this patent is extended or adjusted under 35 U.S.C. 154(b) by 324 days.

(21) Appl. No.: 15/000,922

(22) Filed: Jan. 19, 2016

(65) Prior Publication Data

US 2016/0129585 A1    May 12, 2016

Related U.S. Application Data

(63) Continuation of application No. 14/059,937, filed on Oct. 22, 2013, now Pat. No. 9,241,875, which is a
(Continued)

(51) Int. Cl.
| | |
|---|---|
| *B65B 43/42* | (2006.01) |
| *B25J 9/00* | (2006.01) |
| *G07F 11/16* | (2006.01) |
| *G07F 17/00* | (2006.01) |
| *A61J 1/20* | (2006.01) |
| *A61J 1/06* | (2006.01) |
| *B25J 11/00* | (2006.01) |

(Continued)

(52) U.S. Cl.
CPC .  *B25J 9/00* (2013.01); *A61J 1/06* (2013.01); *A61J 1/20* (2013.01); *B25J 11/00* (2013.01); *B25J 15/00* (2013.01); *B65B 3/003* (2013.01); *G07F 11/165* (2013.01); *G07F 17/0092* (2013.01); *B65B 5/103* (2013.01); *B67C 3/242* (2013.01)

(58) Field of Classification Search
CPC .... B25J 9/00; B25J 15/00; B25J 11/00; B65B 3/003; B65B 5/103; A61J 1/06; A61J 1/20; G07F 17/0092; G07F 11/165; B67C 3/242
See application file for complete search history.

(56) References Cited

U.S. PATENT DOCUMENTS

| | | |
|---|---|---|
| 1,594,465 A | 8/1926 | Miller |
| 3,202,449 A | 8/1965 | Lemelson |

(Continued)

*Primary Examiner* — Jason K Niesz
(74) *Attorney, Agent, or Firm* — Myers Bigel, P.A.

(57) ABSTRACT

A method of retrieving a vial from a carrier includes the steps of: contacting a vial contained within a carrier with a gripper assembly to shift the position of the container to one end of the carrier and to adjust the position of the carrier on a platform from a diverted position to a retrieval position; lifting the vial from the carrier with the gripper assembly; and returning the vial to the carrier with the gripper assembly. Such a method can improve the accuracy and precision of moving the vial to and from the carrier for dispensing.

8 Claims, 13 Drawing Sheets

Related U.S. Application Data continuation of application No. 13/016,062, filed on Jan. 28, 2011, now abandoned.

(60) Provisional application No. 61/353,510, filed on Jun. 10, 2010.

(51) Int. Cl.
  *B25J 15/00* (2006.01)
  *B65B 3/00* (2006.01)
  *B67C 3/24* (2006.01)
  *B65B 5/10* (2006.01)

(56) References Cited

U.S. PATENT DOCUMENTS

| | | |
|---|---|---|
| 3,880,294 A | 4/1975 | Arsenault |
| 4,114,464 A | 9/1978 | Schubert et al. |
| 4,600,357 A | 7/1986 | Coules |
| 4,919,588 A | 4/1990 | Brun |
| 5,741,343 A | 4/1998 | Lloyd et al. |
| 6,971,541 B2 | 12/2005 | Williams et al. |
| 7,228,198 B2 | 6/2007 | Vollm et al. |
| 7,289,879 B2 | 10/2007 | Williams |
| 7,721,508 B2 | 5/2010 | Yuyama et al. |
| 8,167,008 B2 | 5/2012 | Taniguchi et al. |
| 2004/0034447 A1 | 2/2004 | Vollm |
| 2005/0145640 A1 | 7/2005 | Williams et al. |
| 2007/0267096 A1 | 11/2007 | Uriel |
| 2008/0110921 A1 | 5/2008 | DuMond |
| 2008/0164281 A1 | 7/2008 | Yuyama |
| 2008/0210755 A1 | 9/2008 | Salzarulo |
| 2008/0224491 A1 | 9/2008 | Gillespie et al. |
| 2009/0178464 A1 | 7/2009 | Ubel et al. |
| 2009/0272757 A1 | 11/2009 | Rivenbark, Jr. |
| 2009/0294464 A1 | 12/2009 | Michelli et al. |
| 2010/0006584 A1 | 1/2010 | Michelli |
| 2010/0050570 A1 | 3/2010 | Mori |
| 2010/0101356 A1 | 4/2010 | Albin |
| 2010/0230004 A1 | 9/2010 | Taniguchi |
| 2012/0024423 A1 | 2/2012 | Imai |
| 2012/0029692 A1 | 2/2012 | Owen |
| 2012/0031043 A1 | 2/2012 | Yuyama |
| 2012/0042609 A1 | 2/2012 | Inoue |

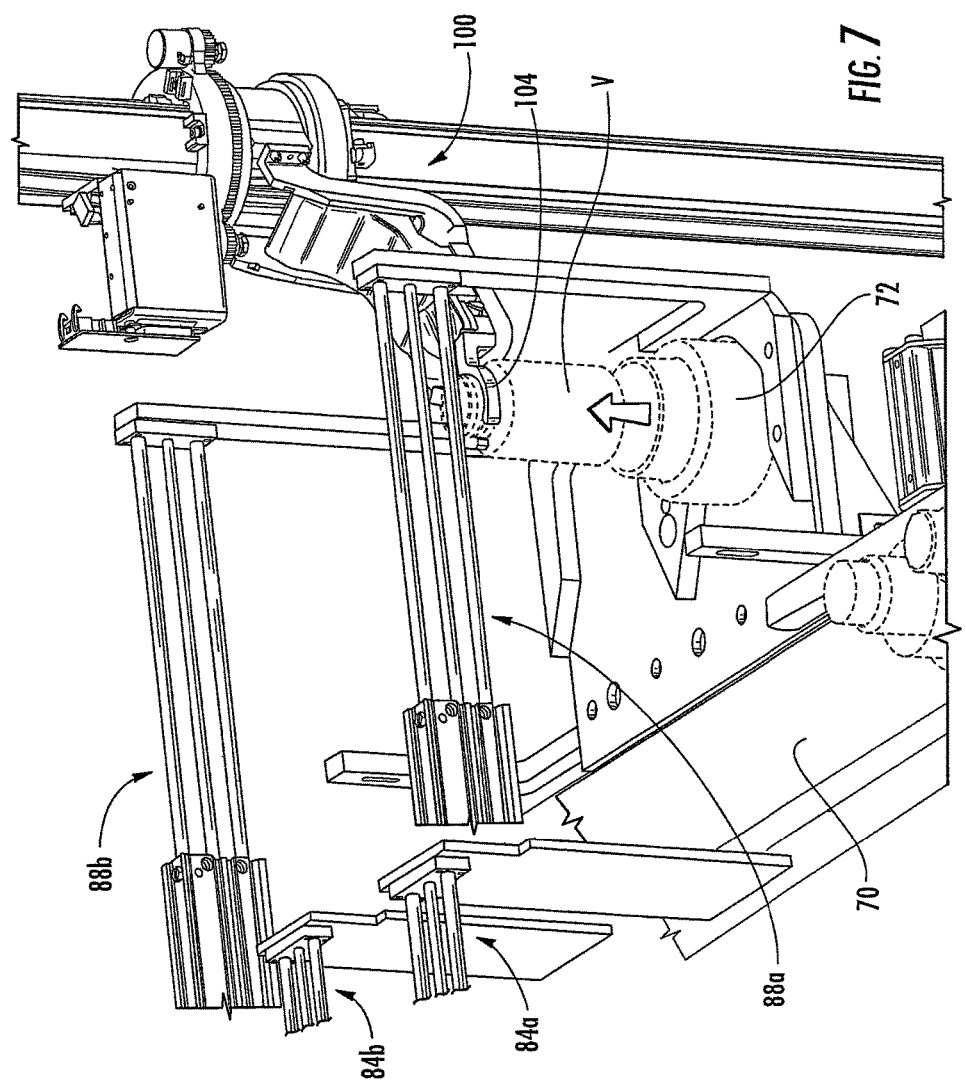

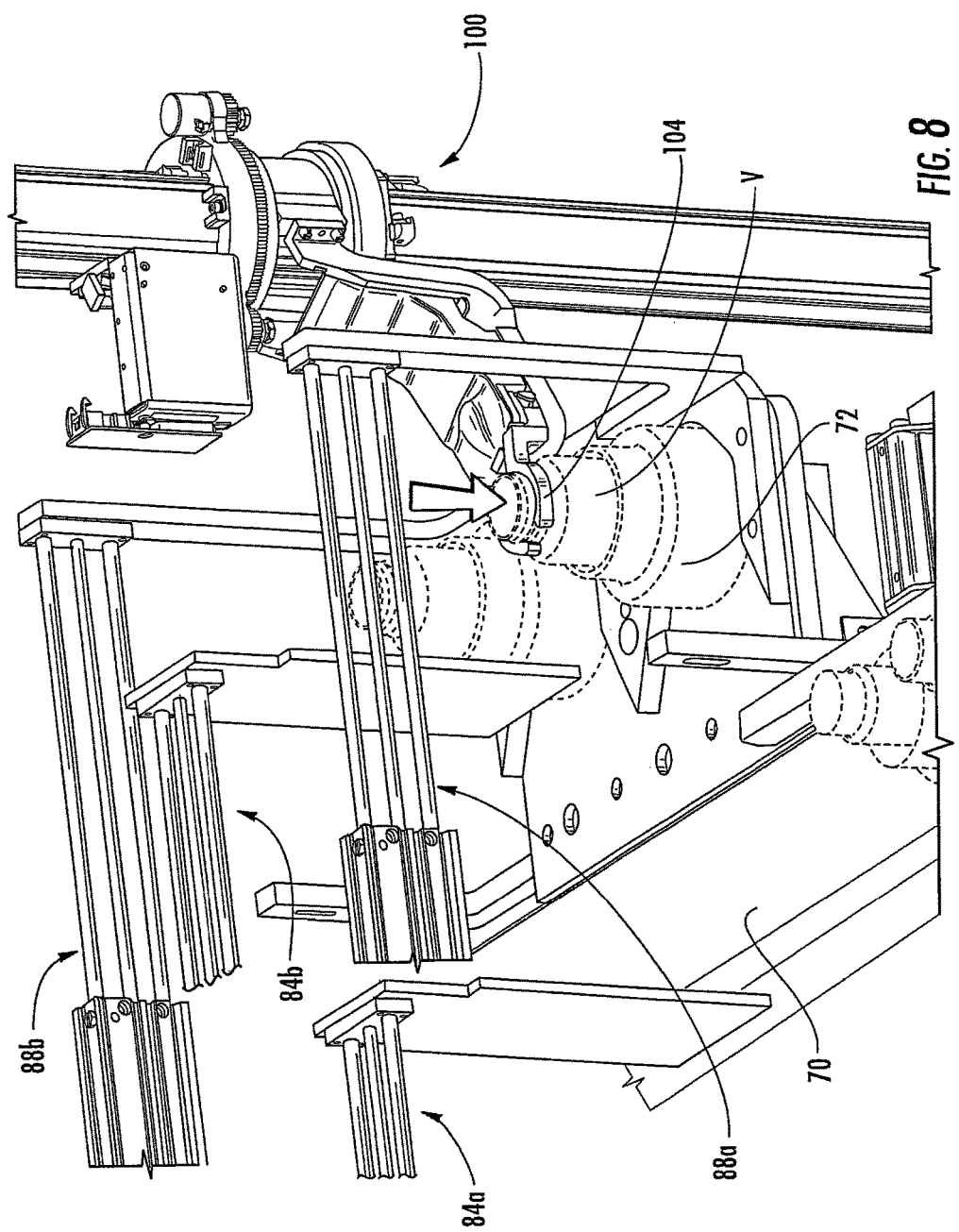

SYSTEM AND METHOD FOR HIGH-VOLUME FILLING OF PHARMACEUTICAL PRESCRIPTIONS

RELATED APPLICATIONS

This application is a continuation of U.S. application Ser. No. 14/059,937, filed Oct. 22, 2013, which is a continuation of U.S. patent application Ser. No. 13/016,062, filed Jan. 28, 2011, which claims priority from U.S. Provisional Patent Application No. 61/353,510, filed Jun. 10, 2010, the disclosure of which is hereby incorporated herein in its entirety.

FIELD OF THE INVENTION

This invention relates generally to materials handling, and more particularly to pharmaceutical prescription handling.

BACKGROUND OF THE INVENTION

In mail order, central fill and large retail pharmacies, prescription drugs are dispensed in a high volume. For such services, it is known to use an automatic pill dispensing system to carry out the dispensing of the prescription drugs automatically at a rapid rate.

In some high volume systems, separate conveyors and vial carriers may be used to convey vials to and from the automated dispensing apparatus. The vial carriers are typically employed to prevent a vial from toppling over as it is conveyed at high speeds. In many high volume dispensing operations, vials of the same size are filled consecutively (in many cases with the same drug), so carriers of similar size are also used. The vials may be labeled prior to or after filling and/or capping.

A known automatic pill dispensing system is described in U.S. Pat. No. 6,971,541 to Williams et al. This system has the capacity to select an appropriate vial, label the vial, fill the vial with a desired quantity of a selected pharmaceutical tablet, apply a cap to the filled vial, and convey the labeled, filled, capped vial to an offloading station for retrieval. The system has a large number of different bins, or cells, each of which is filled with a specific drug. Two robotic arms transfer each vial between stations for accomplishing many of the various above-mentioned tasks. Counting and dispensing from the cells is carried out with air and suction applied to the cell to agitate pills and direct them to a dispensing outlet, where they are counted as they are dispensed. An updated version of this system is illustrated and described in, for example, U.S. Patent Publication No. 2009-0178464, the disclosure of which is hereby incorporated herein in its entirety. In this later version of the system, only one robotic arm is incorporated, and the vial selection and labeling tasks are performed before the robotic arm picks up the vial. In each instance, the air/suction-based dispensing technique can provide accurate counting and dispensing at high speeds.

It may be desirable to provide a high volume dispensing system that capitalizes on advantages inherent in the Williams et al. type automated dispensing machine.

SUMMARY OF THE INVENTION

As a first aspect, embodiments of the present invention are directed to a method of retrieving a vial from a carrier. The method comprises the steps of: contacting a vial contained within a carrier with a gripper assembly to shift the position of the container to one end of the carrier and to adjust the position of the carrier on a platform from a diverted position to a retrieval position; lifting the vial from the carrier with the gripper assembly; and returning the vial to the carrier with the gripper assembly. Such a method can improve the accuracy and precision of moving the vial to and from the carrier for dispensing.

As a second aspect, embodiments of the present invention are directed to an automated pharmacy machine, comprising: a frame defining a peripheral footprint; a plurality of bins, each of the bins containing a bulk supply of a pharmaceutical; a transition platform mounted to the frame and having at least one retrieval position configured to receive a vial for filling, the retrieval position being located within the footprint of the frame; and a gripper assembly mounted within the frame and configured to grasp and convey a vial from the transition platform to one of the bins for dispensing.

BRIEF DESCRIPTION OF THE FIGURES

FIG. 7 is a perspective view of the gripping assembly grasping the vial.

FIG. 8 is a perspective view of the gripping assembly returning a filled vial to the puck.

DETAILED DESCRIPTION OF EMBODIMENTS OF THE INVENTION

Figure 1:
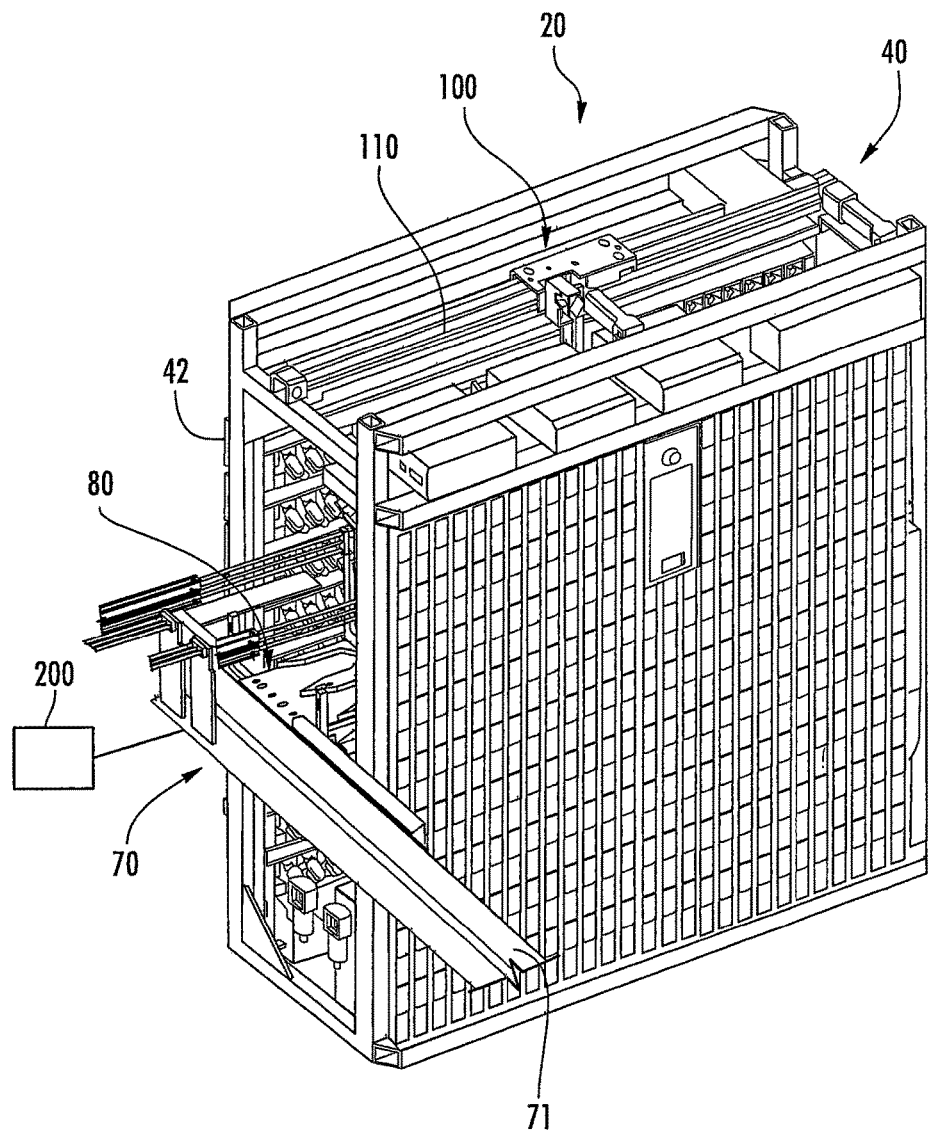
FIG. 1 is a perspective view of an automated pharmaceutical dispensing system according to embodiments of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

As used herein, the term "forward" and derivatives thereof refer to the general direction vial carriers and vials travel as they move from station to station; this term is intended to be synonymous with the term "downstream", which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

Well-known functions or constructions may not be described in detail for brevity and/or clarity.

As described above, the invention relates generally to a system and process for dispensing pharmaceuticals. An exemplary system is illustrated in FIG. 1 and designated broadly at 20. The system 20 includes a conveyor unit 70, a transition platform assembly 80, and an automated dispensing machine 40. These components are described in greater detail below.

The conveyor unit 70 includes a line conveyor 71 that is positioned to convey a series of pucks 72. Each puck 72 is sized and configured to receive a pharmaceutical vial or bottle in a central cavity 74. As used herein, the term "vial" is intended to mean an open-ended container typically used for pharmaceuticals, and is intended to encompass vials, bottles, jars, and the like. The cavity 74 of the puck 72 is typically slightly larger than the vial, which facilitates insertion of the vial in the puck 72, and is typically round. In the illustrated embodiment, pucks 72 are employed to reduce the risk of the vial or bottle tipping during conveying.

Also, in this embodiment, the pucks 72 include an RFID tag (located in a recess in the underside of the puck 72) which indicates a prescription number for the prescription to be filled by the dispensing machine 40 or another indicator of the drug and number of tablets to be dispensed, which can be used to indicate to the system 40 which pharmaceutical is to be dispensed into the vial. As used herein, an "RFID tag" is an object applied to or incorporated into a component for the purpose of identification and tracking using radio waves. Some RFID tags can be read from several meters away and beyond the line of sight of the reader. Many RFID tags contain at least two parts. One is an integrated circuit for storing and processing information, modulating and demodulating a radio-frequency (RF) signal, and other specialized functions. The second is an antenna for receiving and transmitting the signal. There are generally three types of RFID tags: active RFID tags, which contain a battery and can transmit signals autonomously, passive RFID tags, which have no battery and require an external source to provoke signal transmission, and battery assisted passive (BAP) which require an external source to wake up but have significant higher forward link capability providing great read range. Any of these may be used in connection with the present invention. Exemplary RFID tags and readers are disclosed in U.S. Pat. No. 6,317,648 to Sleep et al., the disclosure of which is hereby incorporated herein in its entirety.

Figure 4:
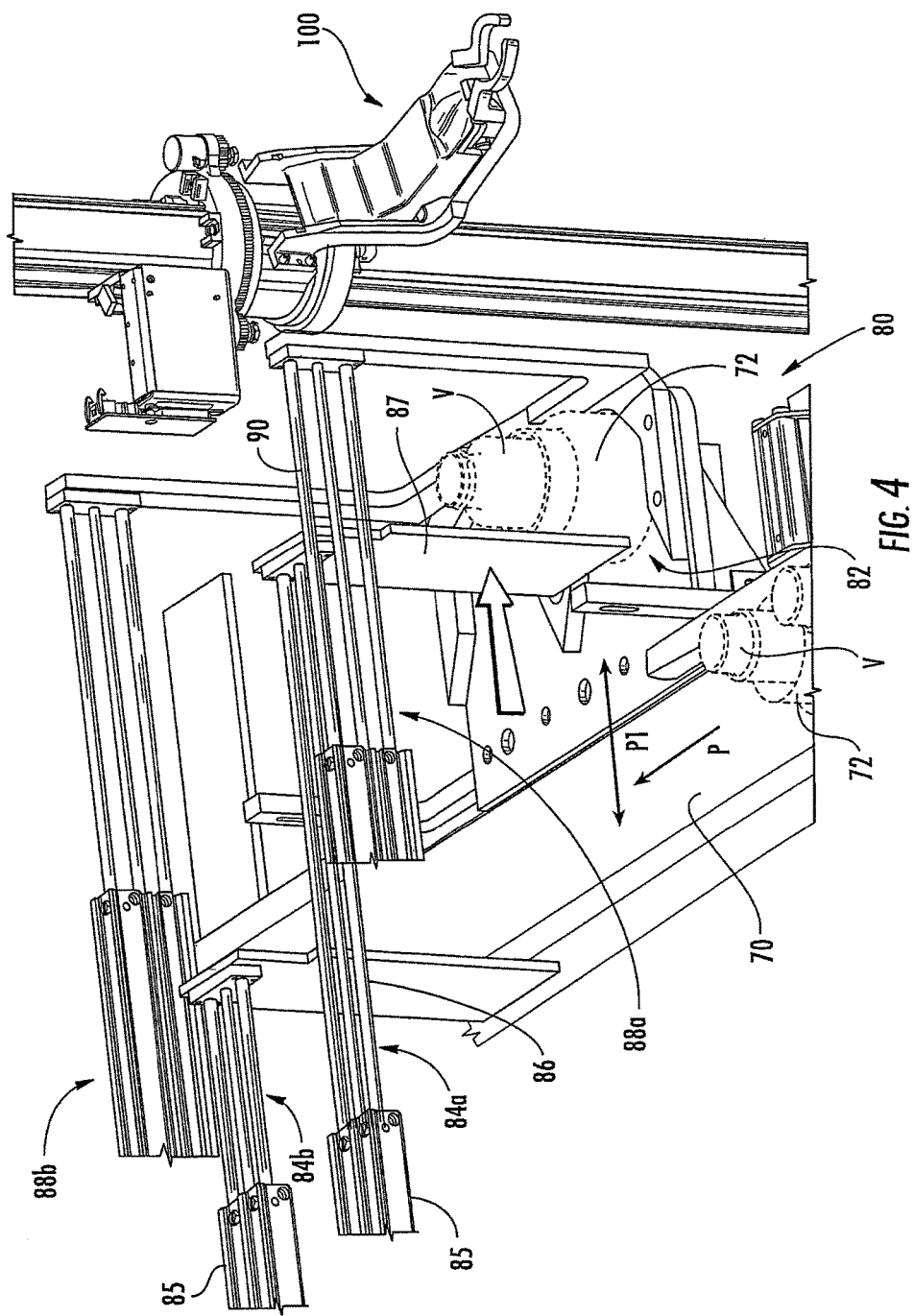
FIG. 4 is a perspective view of a diverter unit diverting a puck and vial into a recess of the delivery platform, the delivered puck being shown in broken line.

Generally, operation of the system 20 commences with pucks containing empty vials being conveyed along a path P from one end of the conveyor unit 70 to a position adjacent the transition platform assembly 80 (FIG. 4). They are diverted to the transition platform assembly 80 (FIG. 4), where a robotic arm 102 of a gripper assembly 100 removes the vial from the puck 72 (FIG. 7) and conveys the vial to be filled with a pharmaceutical from the dispensing machine 40 to the appropriate dispensing location. The arm 102 returns the filled vial to its respective puck 72 (FIG. 8), and the puck 72 and vial are returned to the conveyor 70 and conveyed away from the transition platform assembly 80 (FIG. 9) for further processing (such as capping).

Those skilled in this art will appreciate that the conveyor 70 may take any number of forms, including belt conveyors, rollers, slide conveyors, and combinations thereof. In some embodiments, the conveyor 70 may even take the form of a robotic arm that positions the pucks 72 on the diverter platform 80. Also, in some embodiments, the conveyor unit 70 may be endless (e.g., it may follow an oval path), such that pucks 72 are emptied of their filled vials and automatically returned to a starting point to receive another empty vial for another dispensing operation.

Figure 2:
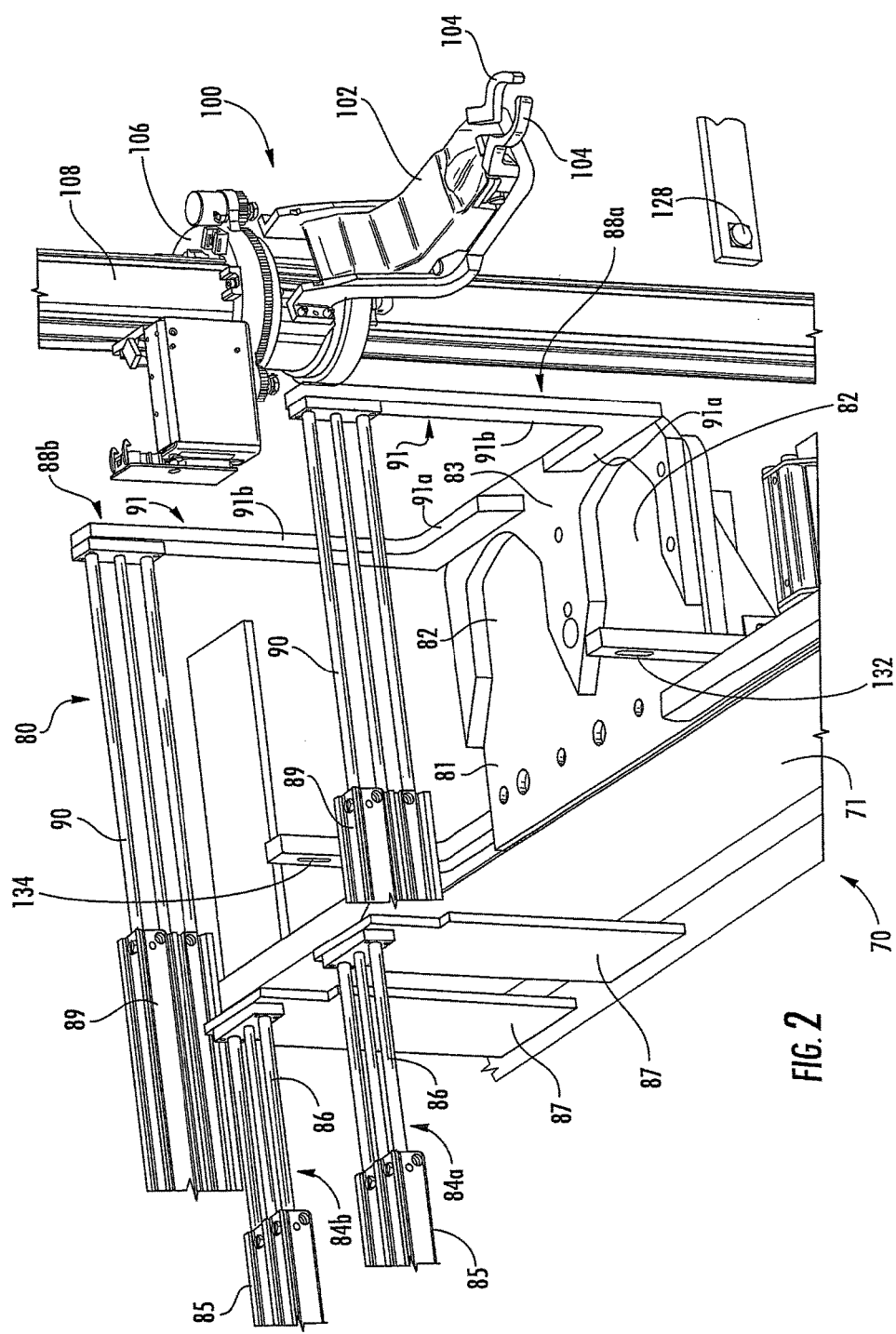
FIG. 2 is an enlarged perspective view of the delivery platform and gripping assembly of the system of FIG. 1.
Figure 2A:
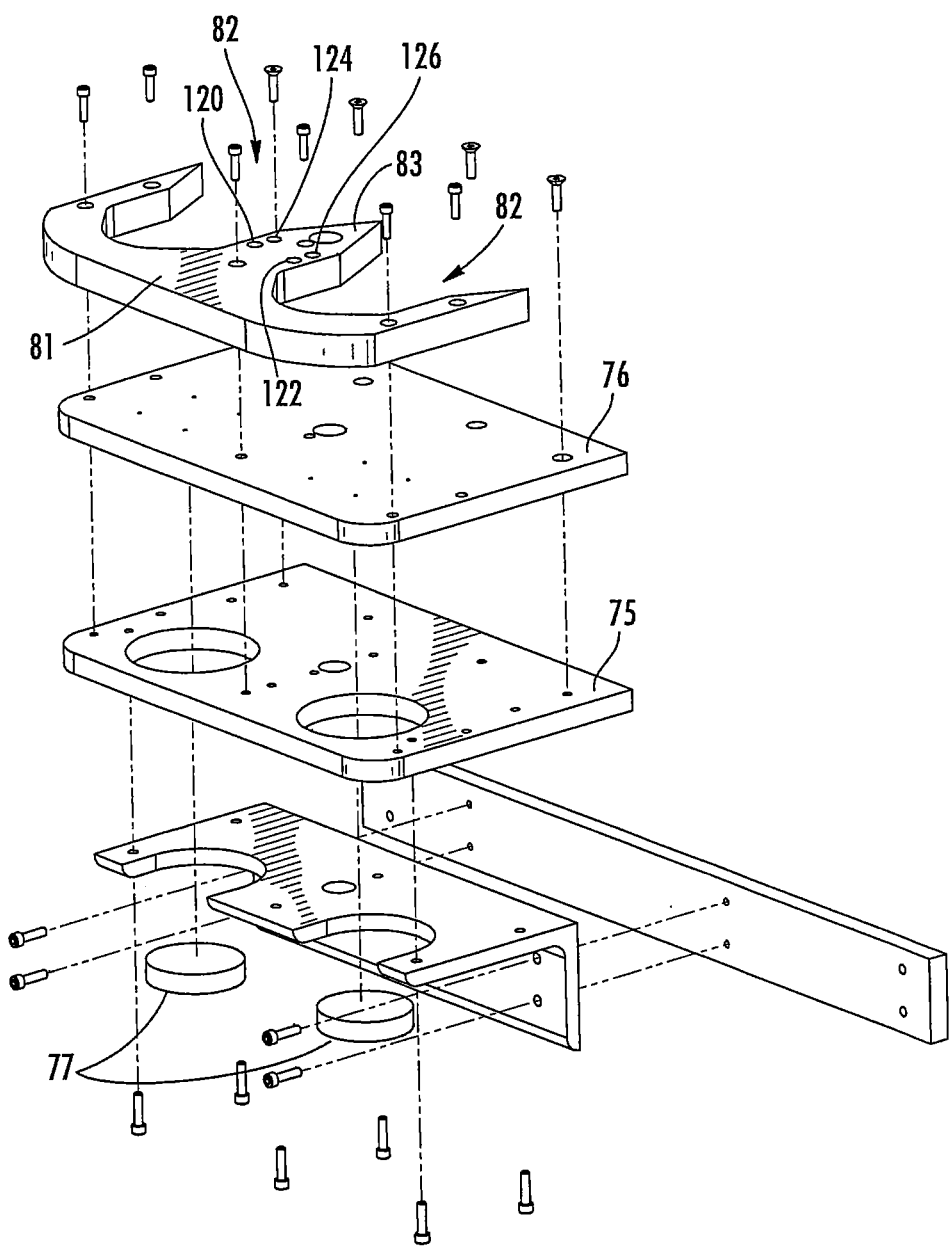
FIG. 2A is an exploded perspective view of the transition platform assembly of FIG. 2.
Figure 3:
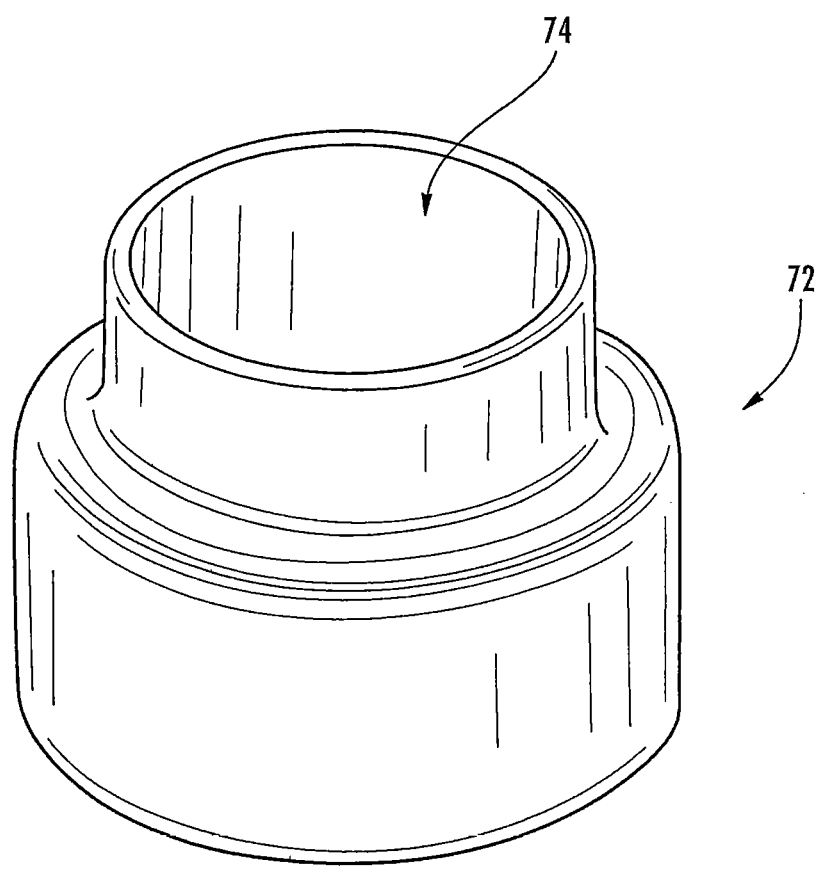
FIG. 3 is a perspective view of a puck for carrying pharmaceutical vials and bottles on the conveyor of the system of FIG. 1.

Referring now to FIGS. 2 and 2A, the transition platform assembly 80 is mounted beside the conveyor 70, such that its upper surface is substantially coplanar with the conveyor 70. The transition platform assembly 80 includes an aligner member 81 that defines two U- or V-shaped recesses 82 divided by a divider 83. The aligner member 81 is mounted atop a base panel cover 76, which covers a base panel 75. An RFID tag reader 77 is mounted on the underside of the base panel cover 76 below each recess 82 and fits within apertures in the base panel 75. Notably, the transition platform assembly 80 is located such that the recesses 82 are within the frame 44 of the automated dispensing machine 40, i.e., within the "footprint" of the machine 40.

Two substantially identical diverting units 84*a*, 84*b* are mounted over the conveyor 71, with diverting unit 84*a* being positioned slightly upstream of the diverting unit 84*b*. Two substantially identical return units 88*a*, 88*b* are also mounted over the conveyor 71, with the return unit 88*a* being positioned in alignment with the diverting unit 84*a* and the return unit 88b being positioned in alignment with the diverting unit 84b. These are discussed separately below.

Each diverter unit 84a, 84b includes a horizontally-disposed guide 85 that extends over the conveyor 70, diverter rods 86 that extend from and retract into the guide 85, and a vertically-disposed paddle 87 that is suspended from the rods 86, and a pneumatic actuator (not shown) that acts to retract and extend the rods 86. When the rods 86 are retracted into the guide 85, the paddle 87 is positioned across the conveyor 71 from the transition platform assembly 80. Each paddle 87 is positioned to be generally aligned with a respective recess 82 of the aligner panel 81.

Each of the return units 88a, 88b includes a guide 89, rods 90, and a pneumatic actuator (not shown) similar to the guides 85, rods 86 and actuator discussed above. An L-shaped, vertically-disposed sweep arm 91 is mounted on the end of each set of rods 90 (with the sweep arm 91 of the return unit 88a being a mirror image of the sweep arm 91 of the return unit 88b). When the rods 90 are extended from the guides 89 and across the conveyor 70, the sweep arm 91 of each return unit 88a, 88b is positioned such that one of the recesses 82 is between the sweep arm 91 and the conveyor 70. In this embodiment, each of the sweep arms 91 is offset from the paddle 87 of its corresponding diverter unit 84a, 84b and positioned such that its lower segment 91a can pass beneath the paddle 87 and its vertical segment 91b can pass beside the paddle 87. Also, the shape of the sweep arms 91 enables them to avoid interference with the gripper assembly 100 as it approaches the transition platform assembly 80.

In the illustrated embodiment, the automated dispensing machine 40 is similar to that described in U.S. Patent Publication No. 2009-0178464, supra, with the vial dispensing, labeling, capping and offloading stations removed. The gripper assembly 100, which includes the robotic arm 102 and gripper fingers 104 mounted thereon, is mounted on a carriage 106 that can translate vertically on a rail 108 and can revolve around the carriage 106. The rail 108 is mounted for translation on a pair of horizontal rails (not shown) that enable the arm 102 to be transported to different positions within the automated dispensing machine 40. The automated dispensing machine 40 includes a large number of dispensing bins, or cells, 42, each of which contains a bulk supply of a pharmaceutical (typically pills or tablets). Typically, different pharmaceuticals are contained in different bins 42. Each of the bins 42 is configured to dispense a given pharmaceutical into a vial held by the gripper fingers 104. Dispensing is achieved by directing air flow within a bin 42 that forces individual tablets into and out of a dispensing outlet into a waiting vial. The tablets are singulated and counted during dispensing. Further discussion of the details of the dispensing and counting operations can be found in, e.g., U.S. Pat. No. 6,971,541 to Williams and U.S. patent application Ser. Nos. 12/492,933 and 12/473,757, the disclosure of each of which is hereby incorporated herein in its entirety. Those spilled in this art will recognize that other configurations of automated pharmacy machines, such as those shown in U.S. Pat. No. 7,289,879, may also be employed.

Referring to FIG. 1, a controller 200 is connected with the conveyor unit 70, the transition platform assembly 80 and the automated dispensing machine 40 for controlling operations. In some embodiments, the controller 200 will be operatively connected with an external device, such as a personal or mainframe computer, that provides input information regarding prescriptions. In other embodiments, the controller 200 may be a stand-alone computer that directly receives manual input from a pharmacist or other operator.

An exemplary controller is a conventional microprocessor-based personal computer. The controller 200 may also be divided into multiple computers, networks, processors, etc., that combine and/or share operations. For example, one portion of the controller 200 may be internal to the automated dispensing machine 40 and control the dispensing operations of the system 20, and another portion of the controller 200 may be external to automated dispensing machine 40 and control the conveying operations of the system 20.

The system 20 also includes a series of sensors connected with the controller 200 for detecting the presence of objects within the system 20. Sensors 120, 122 are positioned on the transition platform assembly 80 to detect the presence of a puck 72 in a respective recess 82. Sensors 124, 126 are positioned on the transition platform assembly 80 to detect the presence of a vial within a puck 72 as the puck 72 resides in a respective recess 82. A sensor 128 is positioned on the frame of the automated dispensing machine 40 to detect the presence of the gripping assembly 100 above the base plate cover 76. Sensors 132, 134 are mounted near the conveyor 71 to detect the presence of a puck in position to be diverted by one of the diverting units 84a, 84b.

Operation of the system 20 commences with a puck 72 on the conveyor 71 upstream of the transition platform assembly 80 receiving a vial V of the proper size for a particular prescription. Depending on the arrangement of the system 20, the vial V may be selected based on the reading of the RFID tag on the puck 72, or may be part of a lengthy "run" of prescriptions using the same size vial. The vial V may or may not be labeled at this point in the operations. Also, the vial V may be manually inserted into the puck 72 or may be inserted automatically (e.g., with a robotic arm or a pick-and-place device).

Figure 10:
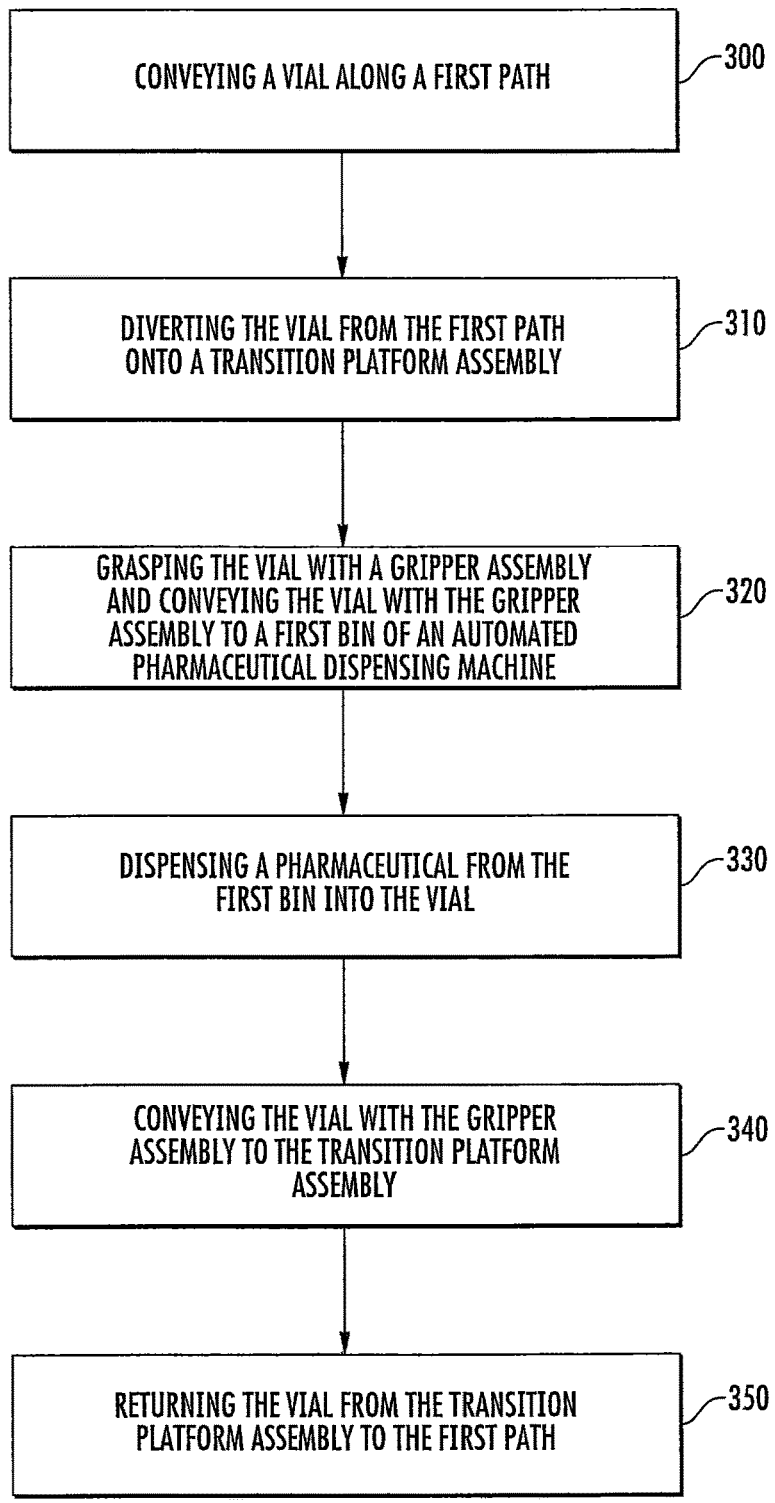
FIG. 10 is a flow chart describing operations according to embodiments of the present invention.

The conveyor 70 then conveys the puck 72 and vial V downstream (see Block 300 of FIG. 10). In some embodiments, a "hold-back" device, such as a retractable stop, holds multiple pucks/vials in place on the conveyor 71 upstream of the transition platform assembly 80 and releases them downstream one at a time. When one of the sensors 120, 122 detects that its associated recess 82 is void of a puck 72, it signals the hold-back device to release the next puck 72 and vial V toward the transition platform assembly 80.

As the puck 72 and vial V reach the transition platform assembly 80 and the sensor 120, 122 confirms the continued absence of a puck 72 in one of the recess 82, the controller 200 selects the appropriate diverter unit 84a, 84b to divert the puck 72 from the conveyor 71 and signals the selected diverter unit to divert the puck 72 and vial V. Actuation of the diverter unit 84a, 84b is initiated by one of the sensors 132, 134, which detects the presence of the puck 72 in front of the respective paddle 87 of a diverter unit 84a, 84b. Once the puck 72 is detected by the sensor 132, 134, the controller 200 actuates the diverter unit 84a, 84b to be used to divert the puck 72. In some embodiments, the controller 200 selects the diverter unit 84b (which is farther downstream) as a default unless it already houses a puck 72.

When the selected diverter unit 84a, 84b (illustrated as diverter unit 84a in FIG. 4) is actuated, the rods 86 thereof extend from the guide 85, thereby forcing the paddle 87 toward the aligner plate 81 along a diversion path P (Block 310 of FIG. 10). The paddle 87 contacts the puck 72 and slides the puck 72 and the vial V from its location on the conveyor 70 into the corresponding recess 82. The V-shape of the edge of the recess 82 assists in positioning the puck 72 and vial V for the gripper assembly 100. As noted above, the position of the puck 72 in the recess 82 is within the footprint of the frame 44 of the machine 40.

In some embodiments, it may be particularly advantageous for the puck 72 to be positioned within the footprint of the machine 40. For example, if, as is the case with the illustrated system, the puck 72 is diverted completely from the conveyor 71 as the vial is being filled by the automated dispensing machine 40, then the automated dispensing machine 40 may be oriented in any orientation that is considered to be desirable or advantageous. In certain embodiments, the ability to align the automated dispensing machine 40 to be generally perpendicular to the direction of conveyor travel may be advantageous, as it may enable the density of automated dispensing machines 40 servicing the same conveyor to be increased and/or maximized.

Once the puck 72 and vial V are in place, the sensors 120, 122 and 124, 126 detect their presence, and the RFID sensor 77 reads the RFID tag on the puck 72. Sensing of the RFID tag initiates a fill request for the automated pharmacy machine 40 via the controller 200. The RFID tag may correspond to a particular prescription stored in the database of the controller 200, or may include the prescription information itself. Detection of the RFID tag indicates to the controller 200 the identity and number of pharmaceutical tablets that are to be dispensed into the vial V.

Figure 5:
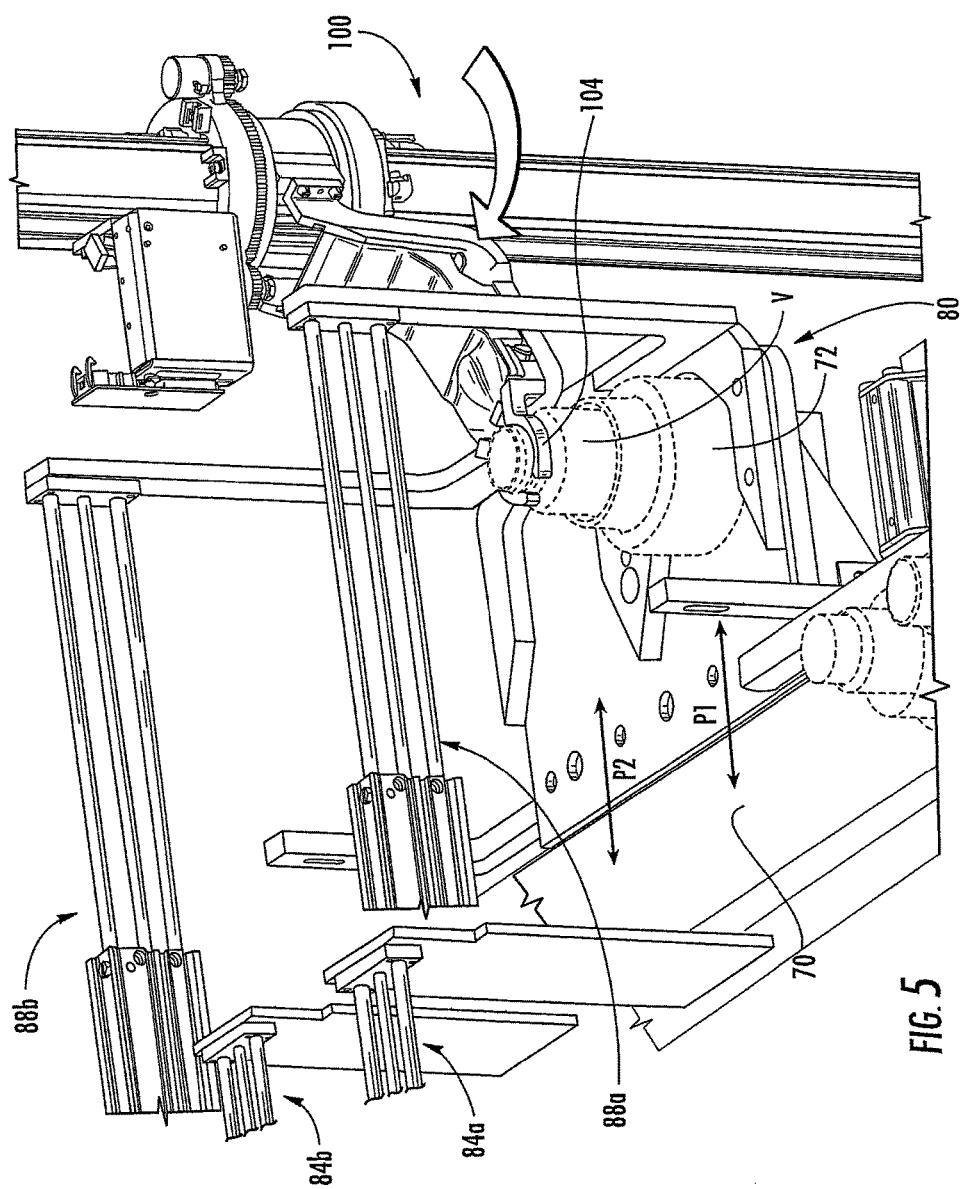
FIG. 5 is a perspective view of the gripping assembly of FIG. 4 as it grasps the vial from the puck delivered to the delivery platform in FIG. 4.
Figure 6A:
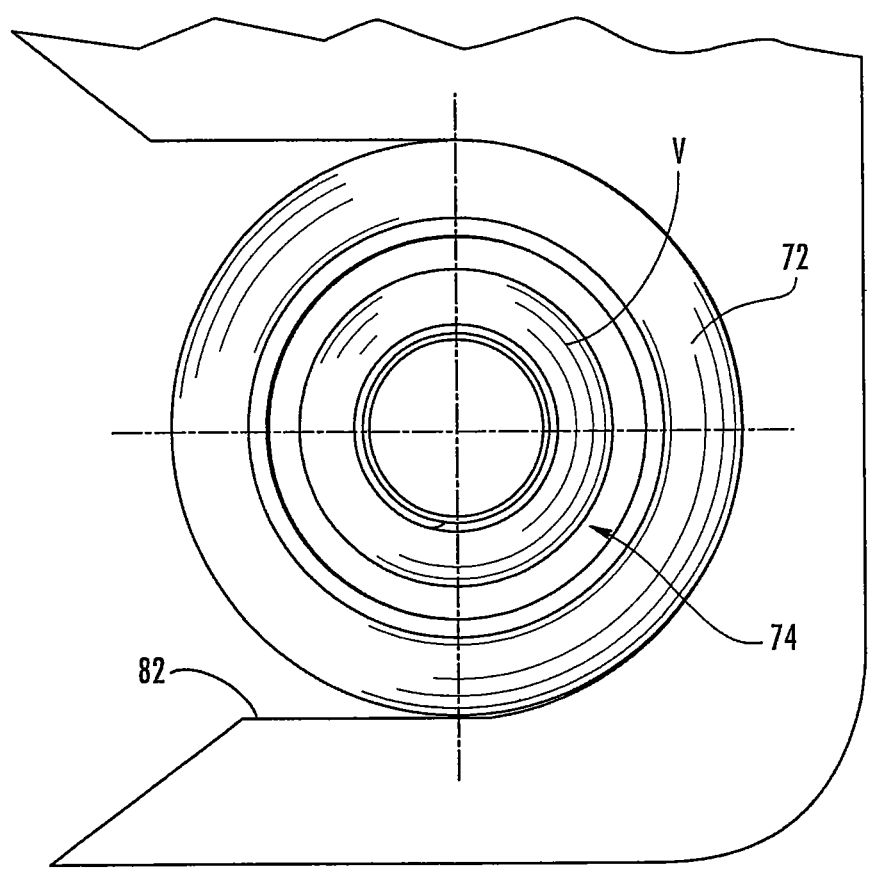
FIGS. 6A and 6B are top views of the puck and vial prior to and after adjustment with the gripping assembly from the diverted position to the retrieval position.
Figure 6B:
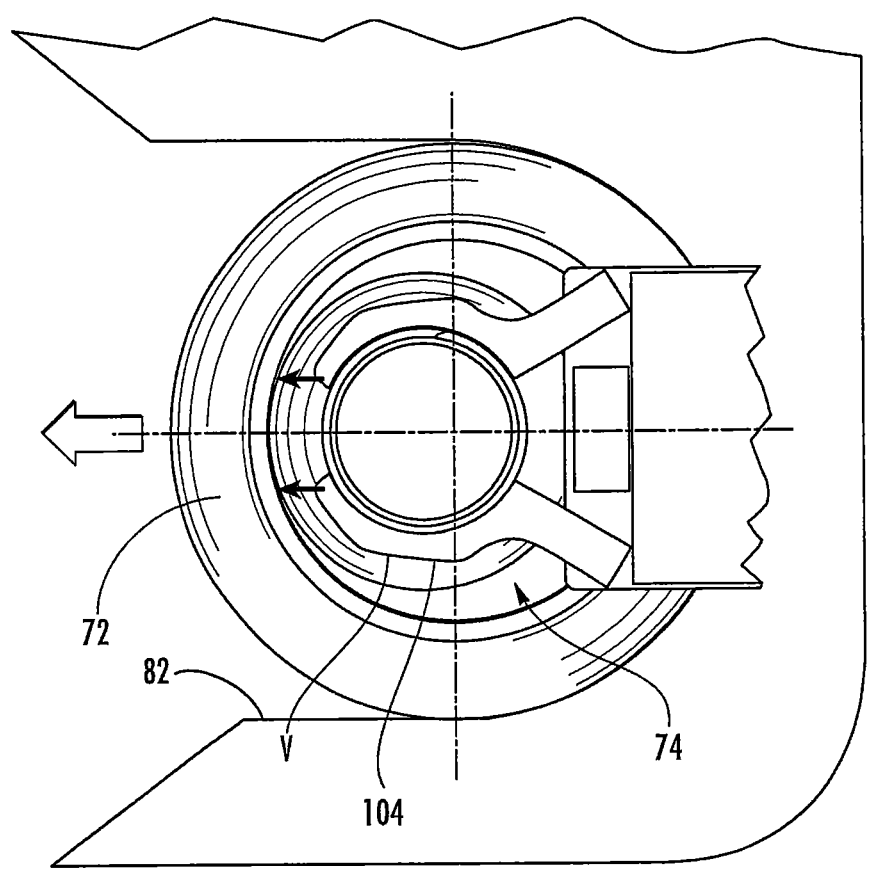

The controller 200 signals the gripper assembly 100 to approach the transition platform assembly 80. As an initial operation, the gripper assembly 100 moves to the puck 72 and vial V and grasps the vial with the fingers 104 (FIG. 5). The gripper assembly 100 then forces the vial V downwardly and pushes the vial V slightly toward the conveyor 70 (FIGS. 6A and 6B). This action forces the vial V against the circumferential edge of the cavity 74 of the puck 72 that is nearest to the conveyor 70, which tends to center the vial V within the cavity 74 of the puck 72 relative to the side edges of the recess 82 (FIG. 6B), and ensures that the gripper fingers 104 grasp the vial V at a consistent height. During the adjustment of the vial V within the puck 72, the puck 72 may also move slightly away from the aligner plate 81 (Block 400 of FIG. 11). Thus, this movement drives the puck 72 from its diverted position (FIG. 6A) to an X-Y retrieval position (FIG. 6B) to which the vial V can be returned after filling. Based on the position of the gripping assembly 100 and the known position of the recess 82, determined through pre-calibration of the system 20, the controller 200 records the retrieval position to which the puck 72 and vial V are pushed, and utilizes that retrieval position as a coordinate once the filled vial V is returned to the puck 72.

Figure 9:
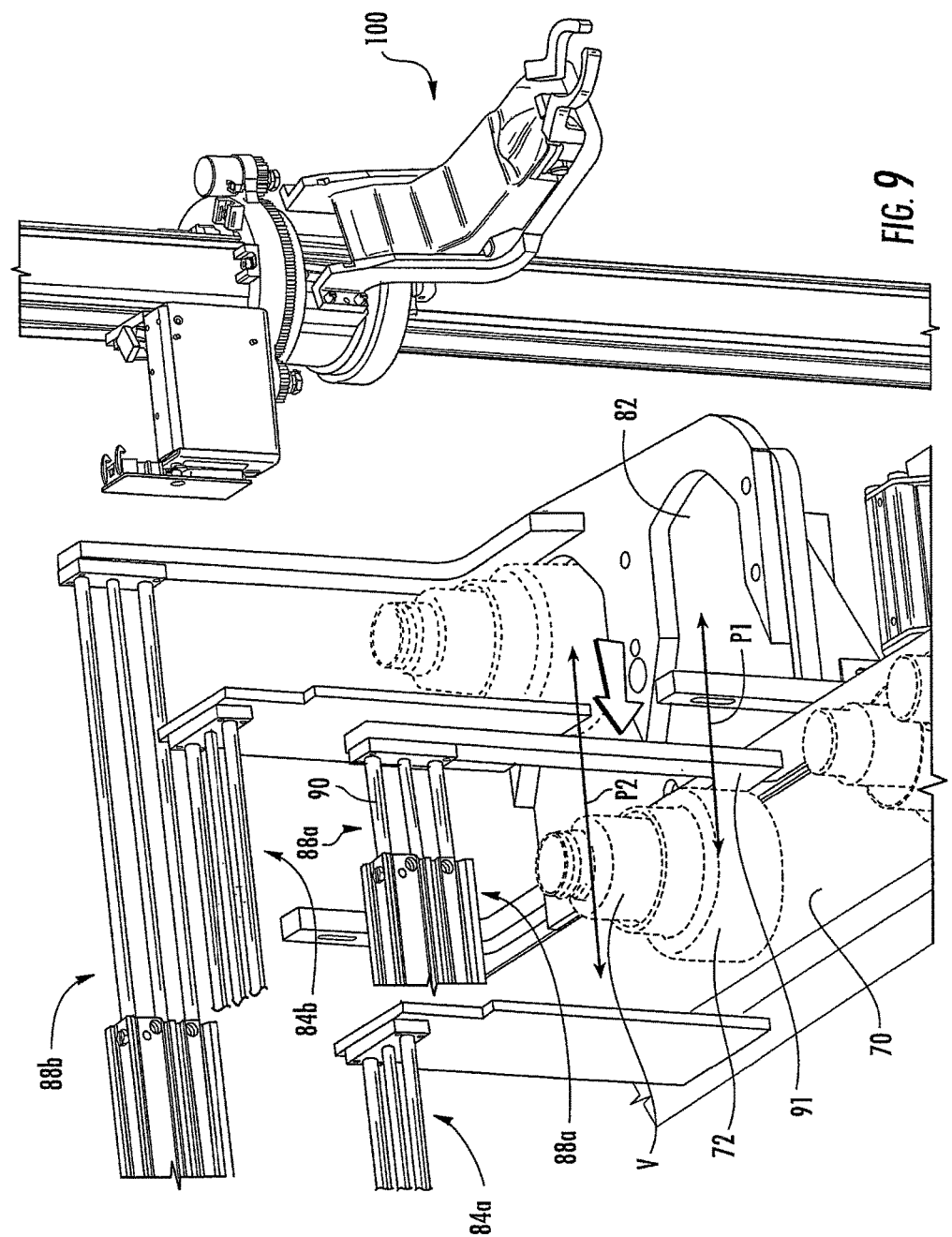
FIG. 9 is a perspective view of the returner assembly returning the puck and filled vial to the conveyor.
Figure 11:
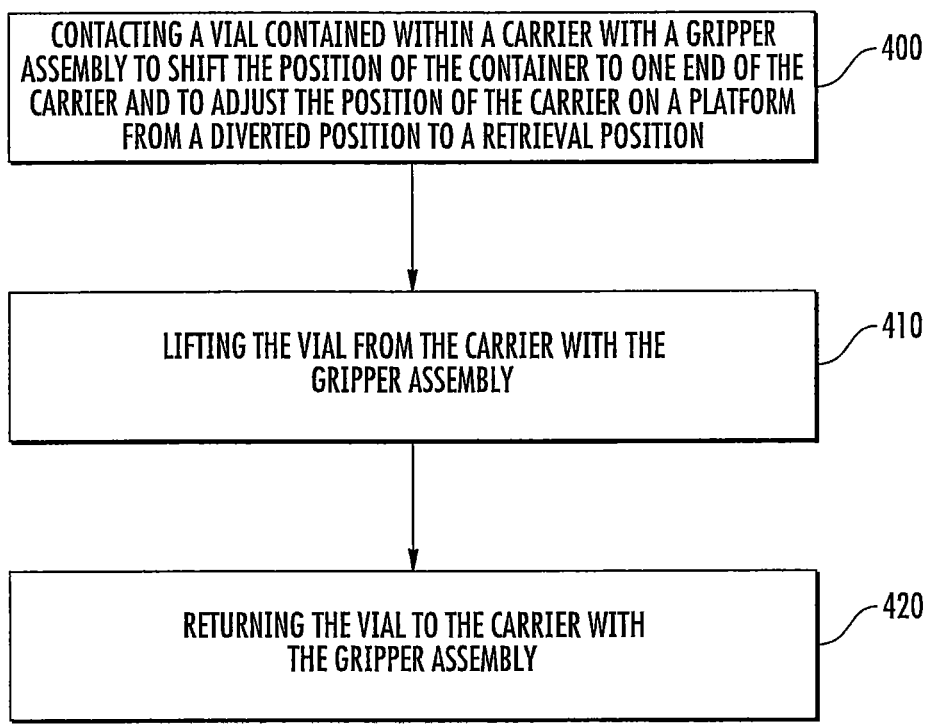
FIG. 11 is a flow chart describing operations according to embodiments of the present invention.

After the positions of the vial and puck 72 have been adjusted and the RFID tag has been detected, the controller 200 signals the gripping assembly 100 to lift the vial V straight up from the cavity 74 of the puck 72 (so as not to disturb the adjusted position of the puck 72)(see FIG. 9, Block 320 of FIG. 10 and Block 410 of FIG. 11). Once the bottom of the vial V has cleared the upper edges of the puck 72, the gripper assembly 100 transports the vial V to the appropriate cell 42 for dispensing of a pharmaceutical from a bin therein into the vial (Block 330 of FIG. 10). Again, exemplary details of the dispensing are described in, for example, U.S. Pat. No. 6,971,541, supra, and need not be described herein.

Once the vial V has been filled in the automated pharmacy machine 40, the controller 200 signals the gripping assembly 100 to return the filled vial V to a position above the puck 72 (Block 340 of FIG. 10 and Block 420 of FIG. 11). The gripping assembly 100 then lowers the filled vial V into the cavity 74 of the puck 72 (FIG. 8). As noted above, the controller 200 knows the position of the cavity 74 due to the adjustment maneuver performed prior to removal of the vial V from the puck 72, and attempts to place the vial V in the center of the cavity 74. The adjustment maneuver can reduce errors (and spills) for this returning step. The gripping assembly 100 then retreats from the diverting platform 80.

After the vial V has been returned to the puck 72 (and after correct filling is confirmed by the controller 200), the controller 200 activates the return unit 88a, 88b corresponding to the diverter unit 84a, 84b used earlier to divert the puck 72 and vial V (illustrated as return unit 88a in FIG. 9). Actuation of the return unit 88a, 88b is delayed until the detection of the vial V in the puck 72 by one or more of the sensors 120, 122, 124, 126 located adjacent to the recess 82. Alternatively, or additionally, the controller 200 may detect the return of the vial V to the puck 72 based on the releasing motion of the gripping assembly 100. or by the absence of the gripping assembly 100 above the base plate cover 76 as detected by the sensor 128.

Actuation of the return unit 88a, 88b causes the rods 90 to retract within the guide 89, thereby drawing the sweep arm 91 toward the conveyor 70 (Block 350 of FIG. 10). During this movement, the sweep arm 91 contacts the puck 72 and pushes the puck 72 and filled vial V onto the conveyor 70 to essentially the same location on the conveyor 70 from which it was originally diverted. From there, the filled vial V and puck 72 are conveyed downstream for further processing (e.g., capping, packaging, etc.). The absence of a puck 72 in the recess 82 is detected by one of the sensors 120, which induces the controller 200 to initiate the release of another puck 72 from the hold-back device on the conveyor 71.

Those skilled in this art will appreciate that the diverter unit 84b the return unit 88b operate in the same manner as the diverter unit 84a and the return unit 88a to divert carriers and vials to the recess 82 and return them to the conveyor 70, but do so along a non-coincident, substantially parallel path P2.

Those skilled in this art will appreciate that the system 20 may be embodied in other forms. For example, the diverter units 84a, 84b may include any variety of diverting member as a substitute for the paddles 87, and/or may include other means for extending and retracting the diverting members. Similarly, the return units 88a, 88b may include alternative return members to replace the sweep arms 91, and/or may include other means for extending and retracting the return members.

In addition, although the pucks 72 represent one embodiment of vial carrier that is suitable for use with this invention, other vial carriers of different shapes and sizes may also be employed. In some embodiments, the pucks 72 may lack an RFID tag, such that the sequence of prescription dispensing is retained in the controller itself, or the pucks 72 may include a different type of identifying indicia, such as a bar code.

It should also be apparent to those of skill in this art that the system 20 may be constructed by retrofitting an existing automated pharmacy machine 40. For example, an automated pharmacy machine such as that described in U.S. Patent Publication No. 2009-0178464, supra, may in some embodiments be modified by removing the vial dispensing, labeling, and capping stations. These system components may be replaced with additional dispensing cells, and/or a number of cells may be omitted to allow mounting of the transition platform assembly 80.

Also, the system 20 may be employed in a stand-alone fashion, with all pucks 72 and vials V being filled by the system 20, or the system 20 may be part of a larger high-volume filling operation. In such an operation, pucks and vials to be filled by the system 20 may be diverted onto or toward the conveyor unit 70 from a main line conveyor or the like that also conveys other pucks and vials to other dispensing apparatus. In other embodiments, the conveyor unit may be routed through the automated pharmacy machine 40.

Further; the adjustment maneuver performed with the gripper 102 may be performed in other ways. For example, the gripper 102 may simply contact the vial or puck while adjusting its position rather than actually grasping the vial, with that the controller 200 recording the position accordingly. The action of forcing the vial downwardly may be omitted in some embodiments.

Moreover, in some embodiments the automated pharmacy machine 40 may include a vial dispensing station and a vial labeling station that select a particular vial and label it prior to pharmaceutical tablets being dispensed into the vial. In such a system, the puck or other carrier can be conveyed without a vial to the transition platform assembly 80, where it can receive a filled, labeled vial. The filled, labeled vial and puck can then be returned to the conveyor 71 with one of the return units 88a, 88b for subsequent processing.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An automated pharmacy machine, comprising:
a frame defining a peripheral footprint;
a plurality of bins, each of the bins containing a bulk supply of a pharmaceutical;
a transition platform mounted to the frame and having at least one retrieval position configured to receive a vial for filling, the vials being received for filling from a source outside the footprint of the frame, the retrieval position being located within the footprint of the frame; and
a gripper assembly mounted within the frame and configured to grasp and convey a vial from the transition platform to one of the bins for dispensing and to return a filled vial from a dispensing bin to the transition platform.

2. The automated pharmacy machine defined in claim 1, wherein the transition platform includes a plurality of retrieval positions.

3. The automated pharmacy machine defined in claim 1, wherein the retrieval position is configured to receive a carrier in which a vial resides.

4. The automated pharmacy machine defined in claim 1, wherein the retrieval position is defined by a recess in the transition platform.

5. The automated pharmacy machine defined in claim 1, wherein the gripper assembly is mounted on a vertical rail and can travel vertically thereon.

6. The automated pharmacy machine defined in claim 5, wherein the vertical rail is mounted on a horizontal rail and can travel horizontally thereon.

7. An automated pharmacy machine, comprising:
a frame defining a peripheral footprint;
a plurality of bins, each of the bins containing a bulk supply of a pharmaceutical;
a transition platform mounted to the frame and having a plurality of retrieval positions configured to receive a vial for filling, the vials being received for filling from a source outside the footprint of the frame, the retrieval positions being located within the footprint of the frame and being defined by recesses in the transition platform; and
a gripper assembly mounted within the frame and configured to grasp and convey a vial from the transition platform to one of the bins for dispensing and to return a filled vial from a dispensing bin to the transition platform.

8. An automated pharmacy machine, comprising:
a frame defining a peripheral footprint;
a plurality of bins, each of the bins containing a bulk supply of a pharmaceutical;
a transition platform mounted to the frame and having at least one retrieval position configured to receive a vial for filling, the retrieval position being located within the footprint of the frame and being defined by a recess in the transition platform configured to receive a carrier in which a vial resides; and
a gripper assembly mounted within the frame and configured to grasp and convey a vial from the transition platform to one of the bins for dispensing.

* * * * *